Nov. 25, 1924.                                                    1,516,495
                        H. A. JONES ET AL
                            RAIL STOP
                    Original Filed Jan. 20, 1920
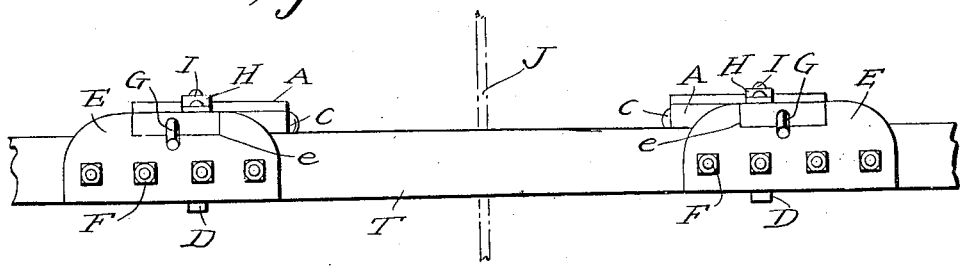
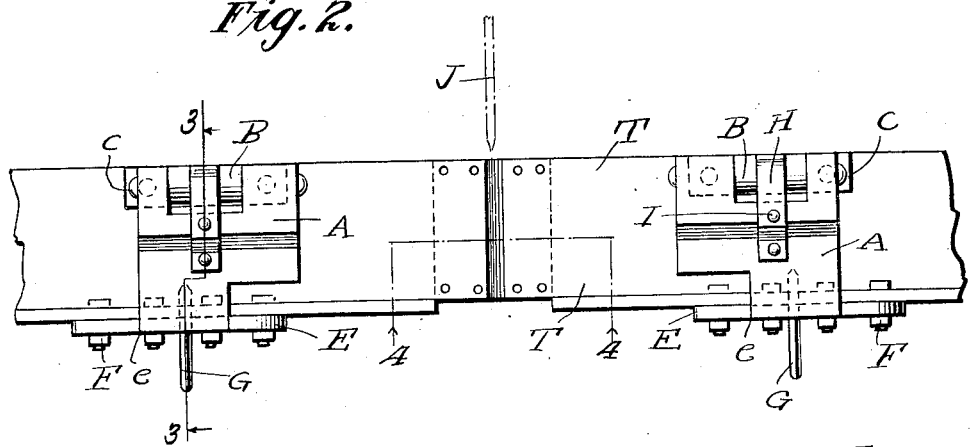
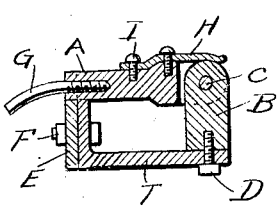
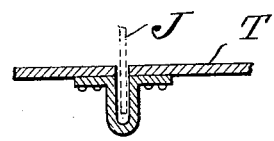
Inventors
Harry A. Jones
and Edward W. Struve
By Richard B. Owen,
Attorney
Witnesses
W. C. Fielding
V. B. Hillyard Patented Nov. 25, 1924.

1,516,495

UNITED STATES PATENT OFFICE.

HARRY A. JONES AND EDWARD W. STRUVE, OF PARSONS, KANSAS.

RAIL STOP.

Application filed January 20, 1920, Serial No. 352,658. Renewed October 14, 1924.

*To all whom it may concern:*

Be it known that we, HARRY A. JONES and EDWARD W. STRUVE, citizens of the United States, residing at Parsons, in the county of Labette and State of Kansas, have invented certain new and useful Improvements in a Rail Stop, of which the following is a specification.

This invention provides for cutting metal rails to a uniform or given length and supplies stop means in connection with a table and cutter whereby to properly position the work to insure performance of the same in a rapid and accurate manner.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

Referring to the accompanying drawings:—

Figure 1 is a front view of a work table or support provided with a pair of stops embodying the invention, the dotted lines indicating a cutter, Figure 2 is a top plan view of the parts illustrated in Fig. 1, Figure 3 is a transverse section on the line 3—3 of Fig. 2, looking to the left as indicated by the arrows.

Fig. 4 is a detail section taken on the line 4—4 of Fig. 2.

Corresponding and like parts are referred to in the following description and indicated in the several views of the drawings by like reference characters.

The movable work table or support is designated by the reference letter T and may be of any construction best adapted for the particular nature of the work for which the invention is designed. As shown most clearly in Fig. 3, the work supporting table consists of a beam which is of L-form in cross section. The letter J designates a stationary cutter which may consist of a circular saw of any desired form according to the character of the work to be operated upon. The work supporting table is shown as being provided with two stops which may be located a like distance from the cutter J. As the stops are of like formation, a detail description of one will suffice for a clear understanding thereof.

A lug or post B is secured by machine screws or other fastenings D to the edge portion of the work table T opposite the vertical flange thereof. A block A constituting the stop is pivotally connected to the upper end of the lug or post B. The edge portion of the block A pivoted to the lug B is recessed to receive the latter and is pivoted thereto by means of a pin C. The swinging edge of the block A is reduced as shown most clearly in Fig. 2 and this reduced portion is adapted to enter a notch or recess —e— in the upper edge of a latch plate E secured to the flanged edge of the table T by means of bolts F or other suitable fastenings. A rod G is attached at the swinging edge of the block A and projects outwardly therefrom and constitutes an operating handle. A metal strip H is secured to the block A by machine screws I or like fastenings and an end portion overhangs the lug B and is adapted to engage the outer side of the lug and limit the movement of the block A when swinging upward into open position.

The stationary cutter J is located at one side of the work table T and the stops are disposed on the work table at each side of the cutter and the required distance therefrom, and the table is slotted and provided with any suitable type of guide to permit of the passage of the saw J therethrough. Where the rails are to be cut to a uniform length the stops will be disposed a like distance upon opposite sides of a plan passed through the cutter J. It will be understood that the rails may be advanced with the table to the cutter from either direction on the work table. When a rail is moved into position, the block A is closed so that its projected end engages the notch or recess —e— in the latch plate E. After the end of the rail engages the block A the rail is moved so that it is cut to the required length by means of the cutter J. By providing a pair of stops the work may be fed to the cutter from either end of the work table. It will be understood that the block A being supported at each edge is well adapted to sustain the impact of the rail when coming in contact therewith. The lug or post B sustains the shock upon one side of the work table and the latch plate E sustains the shock at the opposite edge of the work table. When the block A is swung upward into open position, the outer end of the strip H engages the outer side of the lug B and limits the opening movement of the block. It will thus be understood that the strip H performs the office of a stop which limits the movement of the block A.

Having thus fully described our invention what we claim as new and desire to secure by Letters Patent, is:—

1. A work stop or gage adapted to be applied to a work table, the same comprising a lug at one edge of the table, and a latch plate at the opposite edge of the table, and a block pivoted at one edge to the lug and adapted to have its opposite edge engage the latch plate.

2. In combination with a work table, a lug thereon, a latch plate disposed a distance from the lug, a block constituting a stop recessed at one edge to receive the lug and pivoted thereto, and having its opposite edge adapted to engage a seat in the latch plate.

3. In combination with a work table, a lug thereon, a latch plate secured to the table and having a seat in its upper edge, a block recessed in one edge to receive the lug to which it is pivoted, and having its opposite edge reduced and having the reduced portion adapted to engage the seat of the latch plate, and a handle applied to the swinging edge of the block.

4. In a stop of the character specified, a lug, a block recessed in an edge to receive the lug to which it is pivoted, and a strip projecting from the recessed edge of the block and overhanging the lug and adapted to engage a side thereof to limit the pivotal movement of the block in one direction.

5. In combination with a work table and a cutter in cooperative relation therewith, stops on the table at opposite sides of the cutter, each stop consisting of pivoted members adapted to swing into open and closed position and when closed supported at opposite edges so as to resist the shock when the work comes in contact therewith.

In testimony whereof we affix our signatures in presence of two witnesses.

HARRY A. JONES.
EDWARD W. STRUVE.

Witnesses:
JOHN S. WOOD,
C. W. ORNER.